Figure 1:
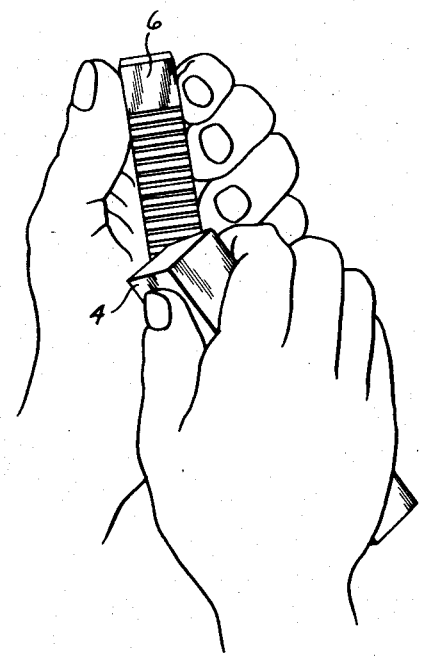

June 23, 1953   C. D. GREEN   2,642,699
DUCK CALL
Filed Nov. 25, 1950

INVENTOR.
Carl D. Green
BY
Atty.

Patented June 23, 1953

2,642,699

UNITED STATES PATENT OFFICE 2,642,699

DUCK CALL

Carl D. Green, Orchards, Wash.

Application November 25, 1950, Serial No. 197,546

3 Claims. (Cl. 46—189)

This invention relates to a mechanical, reedless, duck call by means of which a hunter may decoy flying or moving ducks into gun range.

One object of my invention is to provide a two-piece mechanical duck call wherein the first piece includes an elongated bar having a plurality of equi-spaced teeth formed on one surface thereof, and the second piece includes a hollow amplifying tube having a sharp edge for engaging the teeth on the bar to simulate the call of a wild duck or other fowl.

The conventional duck call is a reed-type instrument upon which a hunter blows to simulate the natural call of various species of ducks and other wild fowl. Each such species has a definite and unique call which is identifiable by pitch and volume. For example, the mallard, which is the ancestor of the domestic duck, gives forth a frequent, very loud, strident duck call. In the Pacific Northwest, where the mallard is most prized, reed-type calls are in common use. Many hunters, however, have experienced great difficulty in using these calls.

The open season for wild ducks comes in the fall of the year when rain, snow, and generally stormy weather prevails over the northern areas. One difficulty experienced with the conventional reed-type call stems directly from the use thereof in such inclement weather. When the reed becomes damp, it changes tone and the response to calls blown thereon becomes untrue and erratic. In an attempt to protect the reed, many hunters carry the call in a pocket of their waterproof jackets or trousers. This, however, adds to the erratic behavior of the call since lint, dirt, and other foreign matter tend to adhere to and lodge under the reed. Still further, all reeds are fragile and, also, tend to stick. Quite often, a call blown on a reed which is wet, dirty, or in imperfect working order is shrill and unnatural and tends to frighten rather than attract ducks.

Another type duck call which has been made includes a notched stick over which a rod is rapidly stroked into produce a grating noise. This type, also, is possessed of inherent difficulties and disadvantages since the volume of the sound emitted is low and the noise produced only approximates a natural call. Furthermore, the use of such sticks and rods requires a deftness and a high degree of skill unpossessed by the average hunter. Accordingly, the notched stick and rod type duck call has found only limited acceptance.

Having in mind the above difficulties and disadvantages, I have turned my inventive efforts toward the provision of a reedless duck call which will simulate, faithfully, a natural call, which will be unaffected in tone and quality by the condition of the weather, and which will produce a sound of sufficient volume to carry more than a quarter of a mile, if desired. Such an instrument should be, and my invention is, capable of constant use with very little skill or practice so the average hunter may produce a uniform, natural call with a minimum expenditure of effort and practice.

I prefer to make my duck call in two parts: (1) an elongated bar or board having a plurality of equi-spaced teeth formed on one surface thereof; and (2) an elongated sound tube having a hollow bore open to one end thereof to amplify the harmonics produced in the tube as the marginal edge of the tube is drawn over the teeth of the bar. Both parts of my duck call are of a convenient size to be held in the hands of a hunter. The sound tube may be held within the palm of the stroking hand and the open end thus is in position to be palmed, partially covered, uncovered, or otherwise damped or constricted, to vary the vibrating note and volume emitted therefrom.

Accordingly, another object of my invention is to provide the hollow sound box of a reedless duck call with an open, amplifying end and with a closed, soundboard end, whereby a series of strident harmonics, simulating the call of a wild duck, will be induced in the hollow tube and will issue from the open end thereof when the soundboard is caused to vibrate by drawing the edge thereof across a series of equi-spaced teeth formed on a complementary member.

A further object of my invention is to provide a toothed bar for a reedless duck call wherein the teeth are disposed at an oblique angle between 60 and 80 degrees, or more specifically, at an angle of substantially 70° to the plane of the surface of the teeth whereby a maximum volume, correct pitch, and proper angle of contact are obtained when the sound box is drawn thereacross.

Yet another object of my invention is to provide a duck call which is unaffected by moisture or by foreign matter, which will produce a natural, constant tone, and which may be used efficiently with very little practice.

Figure 2:
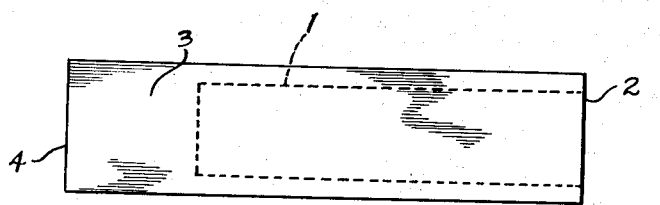
Figure 3:
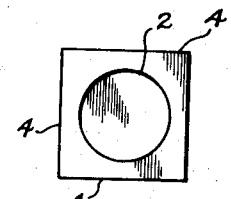
Figures 4, 5:
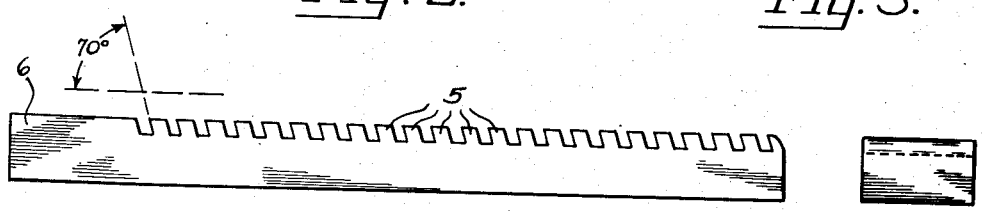

These and other objects and advantages of my invention will be set forth in the following detailed description taken in conjunction with the accompanying drawing, wherein:

Fig. 1 is a perspective view showing the manner in which the two parts of my duck call are gripped preparatory to effecting a call therewith;

Figs. 2 and 3 are related side and end views, respectively, showing the hollow amplifying sound box of my invention and further showing, in dashed lines, the hollow bore thereof and the solid end thereof which defines a soundboard to induce harmonics in the hollow bore; and Figs. 4 and 5 are related side and end views, respectively, showing the elongated bar of my invention having a plurality of equi-spaced lateral teeth formed across the top surface thereof and indicating the angle at which the teeth are disposed to the plane of the top surface thereof.

I make my duck call in two related parts. These are (a) the hollow amplifying box of Figs. 2 and 3 and (b) the toothed bar of Figs. 4 and 5. Both parts are formed from a very hard, close grained wood, such as white birch, so as to be vibrant and to resist abrasion. Furthermore, both members are impregnated with a synthetic or natural resin, lacquer, or other material to prevent absorption of moisture and to harden the abrading surfaces so as to withstand wear. Moisture is the enemy of all duck calls and, were the two parts of my duck call to absorb moisture, the tone would change and the sound would be damped somewhat.

The sound box is an elongated rectangular block of wood having a hollow bore 1 of uniform diameter. The hollow bore 1 terminates, at one end, in an opening 2 and, at the other end, in a solid section 3. The solid section 3, in turn, terminates in a plurality of sharp marginal edges 4, any one or a corner of which may be used to engage the teeth on the elongated bar of Fig. 4.

The solid end 3 of the sound box serves a dual function. First of all, this solid portion defines a sound tube to induce harmonics in the hollow bore 1 when one of the sharp marginal edges 4 is drawn across the teeth of the elongated bar. In the second place, it will be noted that the sound box is of polygonal or square cross section to allow the end 3 to be grasped firmly between the thumb and forefinger of the hunter's stroking hand. As will be apparent, this polygonal finger grip portion is of importance since it allows the sound box to be gripped at a point spaced from the hollow bore 1 so that the sound induced therein will not be damped when a maximum volume call is to be produced.

Referring now to Figs. 4 and 5, it will be seen that the elongated bar is also formed with a polygonal cross section. Into one of the plane surfaces of the bar, I prefer to cut a plurality of equi-spaced lateral teeth 5. These teeth may extend the full length of the bar but I prefer to space them somewhat from one end to define a solid finger grip portion 6. This finger grip 6 allows the bar to be held without interference with the toothed portion. Furthermore, I have discovered that the tone of my duck call can be varied by varying the manner in which the bar is held. For example, if the elongated bar is held only by the finger grip portion 6, a high, strident call will be produced. If, however, the entire length of the bar is gripped, somewhat as shown in Fig. 1, the call will have a lower pitch and will not carry quite so far.

Experience has also taught that the shape and angle of the teeth 5 is more or less critical. To this end, an angle of 70° with the surface of the teeth (see Fig. 4) has been found most practical although an angle within the range of 60° to 80° will also function. Furthermore, the teeth 5 should be spaced equal distances from one another and should be of uniform thickness. For example, if the overall dimensions of the elongated bar are 6 inches by 7/8 inch and if the bar is 1/2 inch thick, I prefer to use a tooth which is 1/8 inch high, 1/8 inch thick, and is spaced from adjacent teeth by 3/32 inch. While these dimensions are not critical, they are a preferred embodiment of my inventive concept.

In the operation of the duck call, the two parts are gripped as shown in Fig. 1. That is to say, with a right-handed person, the elongated bar is gripped by the solid finger grip portion 6 with the thumb and forefinger of the left hand while the sound box is gripped by the thumb and forefinger of the right hand along the solid finger hold portion 3. This leaves the thin-walled sound box free to vibrate without being damped by the constricting grip of the hand. Thereafter, one of the sharp marginal edges 4 is stroked at uniform speed over the teeth 5 causing the sound tube or soundboard 3 to vibrate. The soundboard, in turn, induces harmonics within the hollow bore 1 and a call simulating that of a wild duck issues from the opening 2. In calling ducks at a distance, it is necessary that a loud, strident noise be produced to carry a quarter mile or so in order to attract the attention of flying ducks to decoys. As the flying ducks approach the decoys, however, the call must be made softer to simulate the volume of calls of ducks on a body of water. These changing calls may be simulated with my duck call by changing the angle at which the two parts are arranged, by muffling the sound box with the palm of the right hand, by gripping the elongated bar along its entire length, adjacent the center, or at one end, and by using more or less pressure in stroking the sound box over the toothed bar. Furthermore, by varying the length of the stroke and the speed and pressure by which the two parts are stroked over each other, the context of the call, the pitch of the call, and the voice of the call may be changed to vary the "duck talk." Relatively little practice is required to become proficient in the use of my duck call.

In accord with the objects of my invention, it will be seen that I have provided a two-piece mechanical duck call which is unaffected by moisture or other foreign matter, which will produce a constant tone, and which may be used to effect natural calls with very little practice. This duck call includes an elongated bar having a plurality of equi-spaced teeth formed on one surface and a hollow amplifying tube or sound box having a sharp marginal edge for engaging the teeth on the bar to simulate the call of a wild duck or other fowl by stroking the second piece over the first piece. The hollow sound box has an open amplifying end and a closed soundboard end whereby a series of strident harmonics may be induced in the hollow box and will issue from the open end. Further, the toothed bar for my duck call has a plurality of equi-spaced teeth which are disposed at an angle of substantially 70° to the plane of the surface of the teeth to produce a maximum volume and correct pitch.

I claim:

1. A wooden duck call including a vibrator stick and an amplifying sound box, said stick comprising an elongated member of rectangular cross section having parallel transverse slots formed in one face thereof, said amplifier box comprising an elongated block of square cross section having a cylindrical recess formed along its major axis and having one end of said box closed, the corners of said closed end constituting stick engaging portions.

2. In a wooden duck call, the combination of an elongated vibrator stick having a flat side and having a series of transverse slots formed therein normal to its length, the sides of said slots being inclined approximately seventy degrees from its flat side, said slots being less in width than the lands between said slots, and an amplifying box comprised of an elongated wooden block of square cross section having square ends and having a cylindrical bore formed along its major axis extending from one end of the block through the major portion of the block, the corners of said block constituting the stick engaging portions of the box.

3. A duck call having in combination a pair of unattached wooden members, one of which is a vibrator and the other an amplifier, said vibrator comprising an elongated flat-sided stick having parallel transverse grooves formed in its flat sides normal thereto, the sides of said grooves being parallel and sloping in relation to said flat side, said slots terminating short of one end of said stick, said amplifier comprising an elongated wooden block of square cross section having a cylindrical bore along its major axis extending from one end beyond the middle of its length, the closed end of said block being square with relation to its length and its corners constituting the stick engaging portions thereof.

CARL D. GREEN.

References Cited in the file of this patent

UNITED STATES PATENTS

| Number | Name | Date |
|---|---|---|
| 705,819 | Burbank | July 29, 1902 |
| 1,115,575 | Roba | Nov. 3, 1914 |